United States Patent [19]

Kim

[11] Patent Number: 5,327,174
[45] Date of Patent: Jul. 5, 1994

[54] DEVICE FOR DISPLAYING TELETEXT DATA ON ONE SCREEN

[75] Inventor: Jae W. Kim, Kyungki-do, Rep. of Korea

[73] Assignee: Samsung Electronics Co., Ltd., Kyungki-do, Rep. of Korea

[21] Appl. No.: 914,524

[22] Filed: Jul. 17, 1992

[30] Foreign Application Priority Data

Jul. 19, 1991 [KR] Rep. of Korea .......................... 11361

[51] Int. Cl.$^5$ ............................................. H04N 7/087
[52] U.S. Cl. .................................... 348/468; 348/564
[58] Field of Search ................. 358/147, 22, 142, 146, 358/183, 181; H04N 7/08, 7/087

[56] References Cited

U.S. PATENT DOCUMENTS 5,161,012 11/1992 Choi .................................... 358/183
5,177,598 1/1993 Jeong .................................. 358/21 R Primary Examiner—James J. Groody
Assistant Examiner—David E. Harvey
Attorney, Agent, or Firm—Sughrue, Mion, Zinn, Macpeak & Seas

[57] ABSTRACT

A device for displaying teletext information on a screen after decoding teletext data multiplexed into a composite television video signal for performing a full flash function by successively storing teletext data multiplexed into several flash picture planes and for simultaneously displaying the stored teletext data on a screen.

7 Claims, 2 Drawing Sheets

DEVICE FOR DISPLAYING TELETEXT DATA ON ONE SCREEN

BACKGROUND OF THE INVENTION

The present invention relates to a device for displaying teletext involved in a TV broadcasting signal, and more particularly relates to a device for displaying teletext on one screen so as to provide convenient viewing.

Teletext is an information service that provides television viewers with textual and graphic information such as weather forecasts, traffic information and news. Generally, a TV broadcasting station provides a teletext service by providing signals concerning characters and/or simply diagrams in a composite video signal. Since such teletext signals exist in a vertical blanking interval of the composite video signal, the teletext information is displayed on a television screen by decoding the composite video signal by means of a decoder attached to or assembled in a television receiver. In a conventional device, when the user turns on a flash key of a remote controller or a key matrix attached to the television receiver, teletext information within one flash picture plane is decoded and displayed on the lower part of a television screen. In order to see the next flash picture plane after the previous flash picture plane is displayed, the user has to operate a next key for each and every flash picture plane. Further, in order to view a previous flash picture plane again, the user must turn the flash key off and then turn it on again. Then, the user must operate the next key continuously until the desired flash picture plane is displayed. Meanwhile, the user can automatically display all flash picture planes according to the order by operating an automatic key. In this case, since a plurality of flash picture planes are automatically displayed according to a predetermined speed, a viewer may not be able to completely read the teletext information.

Thus, the conventional devices are defective in that there is an inconvenience for the user to operate a flash key and/or a next key for each and every flash picture plane. Furthermore, there is a drawback in that in the case of activating an automatic key a plurality of flash picture planes are automatically displayed at a predetermined speed even though a user may not be able to completely read the displayed teletext information at the predetermined speed.

SUMMARY OF THE INVENTION

Accordingly, it is an object of the present invention to provide a teletext information displaying device having full-flash function for simultaneously displaying a plurality of flash picture planes on one screen so that viewers are able to watch conveniently the teletext information.

To achieve the above object, the present invention provides a device having a decoder for displaying teletext signals multiplexed into a television video signal, comprising a microcomputer for controlling the device in response to an operating signal of any one of several function keys; separating means for separating a horizontal synchronizing signal from the video signal; means for generating, under control of the microcomputer, an address signal according to the separated horizontal synchronizing signal; and storing means, connected to a first output terminal of the decoder, for storing a teletext signal into a location assigned by the generated address signal in accordance with a writing signal from the microcomputer, and for reading the stored teletext signal in accordance with a reading signal from the microcomputer.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
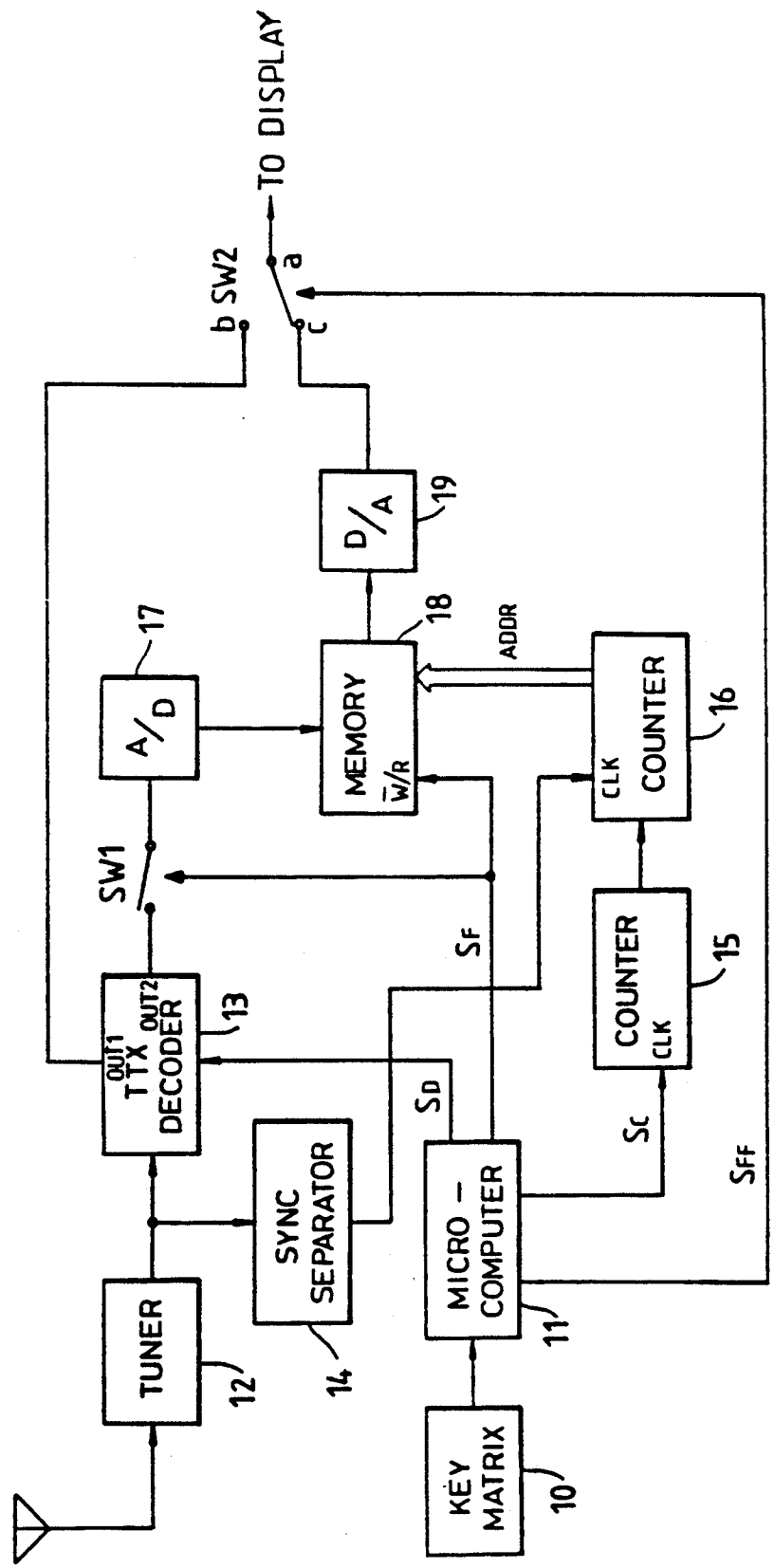
FIG. 1 is a block diagram of a teletext information displaying device according to the present invention.

Referring to FIG. 1, there is shown a teletext information displaying device according to the present invention. The device comprises a key matrix 10 having several function keys, a microcomputer 11 for controlling the device in response to an operating signal provided from any one of the function keys in matrix 10, a teletext decoder 13 for decoding a composite video signal provided from a tuner 12 and for outputting a teletext signal, a synchronous separator 14 for separating a synchronizing signal from the composite video signal output from tuner 12, a first counter 15 for performing up-counting within a predetermined counting section under the control of microcomputer 11, a second counter 16 for performing up-counting within a counting section being designated by the output signal of the first counter 15, a memory 18 for writing and reading teletext data which was transmitted from decoder 13 through a first switch SW1 (which is controlled by the microcomputer 11) and through A/D converter 17 in accordance with the address being designated by the output signal of second counter 16, a D/A converter 19 for converting the teletext data read from the memory into an analog signal, and a second switch SW2 for selectively outputting either the composite video signals from teletext decoder 13 or the teletext signal from memory 18 under the control of microcomputer 11.

In the preferred embodiment of FIG. 1, key matrix 10 has a full flash key for performing a function of full flash in addition to the conventional function keys. If the full flash key is activated, microcomputer 11 generates a decoder control signal $S_D$ for controlling teletext decoder 13 and a flash signal $S_F$ for controlling memory 18 and the first switch SW1. When decoder control signal $S_D$ is input from microcomputer 11 to teletext decoder 13, the teletext decoder 13 decodes the composite video signal provided from tuner 12 and generates teletext signals. Specifically, teletext decoder 13 outputs the composite video signal involving a teletext signal corresponding to one flash picture plane among the decoded teletext signals through first output terminal OUT1 and the teletext signals only through second output terminal OUT2. Also, according to a low level of flash signal $S_F$ provided from microcomputer 11, the first switch SW1 is closed, and memory 18 is set to a write enable state. Flash signal $S_F$ is maintained at the low level until the flash signal is removed or until a full flash key is activated.

On the other hand, whenever a flash key signal or a next key signal is input via key matrix 10, microcomputer 11 generates and provides a pulse as a counter control signal Sc to first counter 15. First counter 15 repeatedly performs an up-counting within a predetermined counting section, by using the counter control signal as a clock. In this embodiment, first counter 15 counts '0' to '15' repeatedly (The reason will be explained hereafter). The output signal of first counter 15 settles a counting section of second counter 16. Second counter 16 has '16' counting sections from '0' to '15' each of which is set to be counted up to '30'. Second counter 16 performs an up-counting within a counting section selected by the output signal of first counter 15.

TABLE 1

| First Counter | Second Counter |
|---|---|
| 0 | 0,1, ..., 29 |
| 1 | 30,31, ..., 59 |
| 2 | 60,61, ..., 89 |
| . | . |
| . | . |
| 15 | 450,451, ..., 479 |

Table 1 shows the output values of first counter 15 and a counting sections of second counter 16 to be selected by the output values of the first counter. For example, where the output value of the first counter is '2' second counter 16 counts '60' to '89'. On the other hand, synchronous separator 14 separates a horizontal synchronizing signal from the composite video signal being output through tuner 12 and provides the separated horizontal synchronizing signal as a clock (CLK) to second counter 16. Therefore, second counter 16 adds numeral '1' to the output value whenever the clock synchronized by the horizontal synchronizing signal is input. The output of second counter 16 is provided to memory 18 as an address for which the area for the decoded teletext data is to be stored. Since the output signal of second counter 16 is added by '1' whenever the clock synchronized by the horizontal synchronizing signal is input, the memory area being addressed corresponds to the area for the teletext data involved in one horizontal scanning line to be stored. In other words, memory 18 stores teletext data in one scanning line whenever the output signal of second counter 16 is added by numeral '1'.

The reason why the 16-counter and the 30-counter are used as first counter 15 and second counter 16 respectively in this embodiment is that teletext data falling under one flash picture plane are usually involved within about 30 scanning lines and teletext data involved in about '16' flash picture planes can be simultaneously displayed on one screen because the number of scanning lines visible on a TV screen is about '480' among the scanning lines of one frame. That is, the output signal of first counter 15 addresses an area for storing teletext data of one flash picture plane unit into memory 18, and the output signal of second counter 16 addresses an area for storing teletext data of one horizontal scanning line unit within the area addressed by the output signal of first counter 15.

If a flash key signal is input from key matrix 10, microcomputer 11 generates decoder control signal $S_D$, flash signal $S_F$ and counter control signal Sc. When the counter control signal Sc is input to the clock terminal CLK of the first counter 15, the initialized first counter 15 outputs numeral '0' to second counter 16. Then, second counter 16 counts and outputs numeral '0' to '29' responding to horizontal synchronizing signals being input to the clock terminal thereof. The output signal of second counter 16 addresses an area for storing teletext data involved in the first flash picture plane among areas for storing teletext data into memory 18. Therefore, memory 18, which is in the state of write enable by flash signal $S_F$, stores the decoded teletext data involved in the first flash picture plane into the area being addressed in accordance with the output signal of second counter 16.

If a viewer depresses a next key of key matrix 10 in order to see the next flash picture plane, microcomputer 11 generates and provides decoder control signal $S_D$ to teletext decoder 13. Teletext decoder 13 outputs the composite video signal involving the decoded teletext signal corresponding to the next flash picture plane through the first output terminal OUT1 and also outputs the teletext signal corresponding to the next flash picture plane only through the second output terminal OUT2. The teletext signal output from second output terminal OUT2 is transferred to memory 18 via first switch SW1 and A/D converter 17. On the other hand, when the next key is activated, microcomputer 11 provides counter control signal Sc to first counter 15. First counter 15 outputs numeral '1' to second counter 16 and therefore the second counting section of second counter 16 is designated. Accordingly, second counter 16 counts and outputs numeral '30' to '59'. The output signal of second counter 16 is provided to memory 18 and addresses an area for storing teletext data involved in the second flash picture plane. Therefore, memory 18, which is in the state of write enable by flash signal $S_F$, stores the decoded teletext data involved in the second flash picture plane into the area being addressed in accordance with the output signal of second counter 16.

As described above, whenever a viewer activates the next key, teletext data corresponding to the next flash picture plane are displayed on the screen and also stored into memory 18 in regular sequence. After watching teletext data involved in the first to tenth flash picture planes for example, if a viewer wants to watch the previously displayed teletext data involved in one or more, or all of the flash picture planes, a viewer can activate a full flash key (not shown) of key matrix 10. In this embodiment, it is possible to watch teletext data involved in up to sixteen flash picture planes again. If the full flash key signal is input, microcomputer 11 generates flash signal $S_F$ having a high level, thereby setting memory 18 in a read enable state, and also opening first switch SW1. Furthermore, microcomputer 11 generates full flash signal $S_{FF}$, thereby connecting output terminal a of second switch SW2 to the second input terminal c thereof. Therefore, the teletext data corresponding to the first to tenth flash picture planes stored in memory 18 are read and transferred to a displayer through D/A converter 19.

If a viewer activates a next key after performing the full flash function described above, microcomputer 11 generates decoder control signal $S_D$, flash signal $S_F$ and counter control signal Sc again, and removes the full flash signal $S_{FF}$ so as to connect output terminal a of second switch SW2 to first input terminal b. Under the control of decoder control signal $S_D$, teletext decoder 13 outputs the composite video signal involving the decoded teletext signal corresponding to the next flash picture plane through the first output terminal OUT1 and also outputs the teletext signal corresponding to the same flash picture plane only through the second output terminal OUT2. Also, flash signal $S_F$ closes first switch SW1 and sets memory 18 in the write enable state. First counter 15 outputs numeral '10' due to the input of counter control signal Sc and therefore the eleventh counting section of second counter 16 is designated. Accordingly, second counter 16 counts and outputs numeral '300' to '329'. Then, memory 18 stores the decoded teletext data involved in the eleventh flash picture plane into the area addressed by the output signal of second counter 16.

Figure 2:
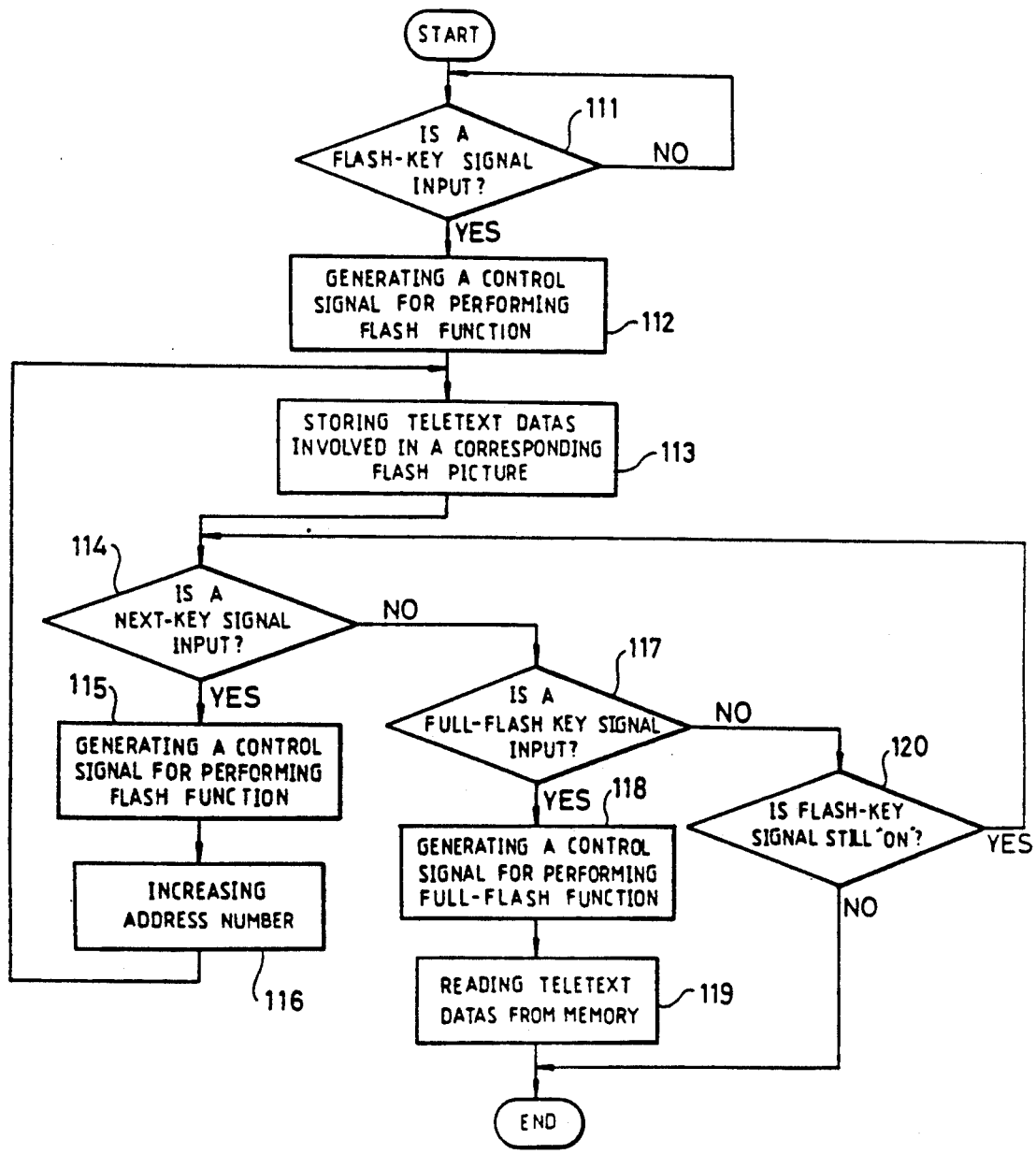
FIG. 2 is a flow chart for explaining the operation of the device of FIG. 1.

FIG. 2 is a flow chart showing the operation of a teletext signal displaying device according to the present invention. Microcomputer 11 repeatedly detects whether or not a flash key signal is input (step 111). If the flash key signal is input, microcomputer 11 proceeds to step 112 and generates several control signals for performing a flash function. That is, microcomputer 11 controls teletext decoder 13 by decoder control signal $s_D$ and sets memory 18 to the write enable state by providing the flash signal with a low level. Also, microcomputer 11 controls an address generating unit having first counter 15 and second counter 16 by counter control signal Sc so as to output address signals for a predetermined section. Thus, teletext signal involved in the first flash picture plane is converted into a digital signal and stored into the addressed area of memory 18. Further, the teletext signal is transferred to a displayer together with a composite video signal (step 113). At step 114, microcomputer 11 checks whether or not a next key signal is input. If it is, microcomputer 11 provides decoder control signal $S_D$ to teletext decoder 13 so as to output a teletext signal involved in the second flash picture plane and also provides counter control signal Sc to first counter 15 (step 115). The address generating unit generates an address signal for which a predetermined section is increased (step 116). Thus, a teletext signal involved in the second flash picture plane is stored into the addressed area of memory 18, and the teletext signal is transferred to a displayer together with a composite video signal (step 113). Whenever the next key is activated, a teletext signal involved in the corresponding flash picture plane is stored into the addressed area in regular sequence by repeating the above described procedures.

At step 114, if a next key signal is not input, microcomputer 11 detects whether a full flash key signal is input at step 117. If it is, microcomputer 11 generates several control signals for performing a full flash function. That is, at step 118 microcomputer 11 controls second switch SW2 by full flash signal $S_{FF}$ and provides flash signal $S_F$ with high level to memory 18 so as to set memory 18 to the read enable state. As a result, teletext data involved in a plurality of flash picture planes, which were stored into the memory 18, are read all together and displayed on a screen of a displayer (step 119). Going back to step 117, if a full flash key signal is not input, microcomputer 11 detects whether or not the flash key signal still exists (step 120). If it exists, microcomputer 11 goes to step 114. Otherwise, the flash function is finished.

As described above, a teletext signal displaying device according to the present invention can display teletext data involved in a plurality of flash picture planes at one time on one picture plane in addition to the conventional functions.

While there has been described what are at present considered to be the preferred embodiment of the invention, it will be understood that various modifications can be made. For example, the first and second counters can be constructed with a microcomputer with a program for performing the function of the counters. Furthermore, the synchronous separator can be substituted by a counter synchronized with a horizontal synchronizing signal. It is intended that the appended claims cover all modifications that fall within the true spirit and scope of the invention.

What is claimed is:

1. A device having a decoder for displaying teletext signals multiplexed into a television video signal, comprising:
    an input device for outputting one of a plurality of different operating signals;
    a microcomputer for outputting control signals in response to an operating signal from said input device;
    a separator for separating a horizontal synchronizing signal from the video signal;
    means for generating an address signal according to the separated horizontal synchronizing signal and a control signal outputted by said microcomputer; and
    storing means, connected to a first output terminal of the decoder, for storing a teletext signal into a location designated by said address signal in accordance with a write control signal from said microcomputer, and for reading the stored teletext signal in accordance with a read control signal from said microcomputer, wherein said address signal generating means includes a first counter for designating a plurality of locations in said storing means, each of the locations able to store teletext data, said storing means storing teletext data in response to a control signal generated by said microcomputer, and a second counter for addressing a plurality of positions within the location designated by the first counter, each of the positions able to store teletext data involved in one horizontal scanning line, said second counter connected to receive the horizontal synchronizing signal from said separator.

2. The device of claim 1, wherein said first counter is operable for counting up to a number which is equal to that number of flash picture planes which can be simultaneously displayed on a screen.

3. The device of claim 1, wherein said second counter is operable for counting up to a number which is equal to that number of horizontal scanning lines corresponding to one flash picture plane.

4. A device having a decoder for displaying teletext signals multiplexed into a television video signal, comprising:
    an input device for outputting one of a plurality of different operating signals;
    a microcomputer for outputting control signals in response to an operating signal from said input device;
    a separator for separating a horizontal synchronizing signal from the video signal;
    means for generating an address signal according to the separated horizontal synchronizing signal and a control signal outputted by said microcomputer;
    storing means, connected to a first output terminal of the decoder, for storing a teletext signal into a location designated by said address signal in accordance with a write control signal from said microcomputer, and for reading the stored teletext signal in accordance with a read control signal from said microcomputer;

a display; and a switching means having first and second terminals, said switching means selectively connecting one of the first and second terminals to an input of said display in response to a control signal generated by the microcomputer, wherein the first input terminal of said switching means is connected to an output terminal of the decoder and the second input terminal of said switching means is coupled to an output of said storing means, wherein said display is connected to the first input terminal of said switching means when said storing means performs a writing operation and to the second input terminal of said switching means when said storing means performs a reading operation.

5. A device having a decoder for displaying teletext signals multiplexed into a television video signal, comprising:

an input device for outputting one of a plurality of different operating signals;

a microcomputer for outputting control signals in response to an operating signal from said input device;

a separator for separating a horizontal synchronizing signal from the video signal;

means for generating an address signal according to the separated horizontal synchronizing signal and a control signal outputted by said microcomputer; and storing means, connected to a first output terminal of the decoder, for storing a teletext signal into a location designated by said address signal in accordance with a write control signal from said microcomputer, and for reading the stored teletext signal in accordance with a read control signal from said microcomputer further comprising switching means, connected between said decoder and said storing means, said switching means being in a closed state when said storing means performs a writing operation, and being in an opened state when said storing means performs a reading operation.

6. A device having a decoder for displaying teletext signals multiplexed into a television video signal, comprising:

an input device for outputting one of a plurality of different operating signals;

a microcomputer for outputting control signals in response to an operating signal from said input device;

a separator for separating a horizontal synchronizing signal from the video signal;

means for generating an address signal according to the separated horizontal synchronizing signal and a control signal outputted by said microcomputer;

storing means, connected to a first output terminal of the decoder, for storing a teletext signal into a location designated by said address signal in accordance with a write control signal from said microcomputer, and for reading the stored teletext signal in accordance with a read control signal from said microcomputer;

a display; and a switching means having first and second terminals, said switching means selectively connecting one of the first and second terminals to an input of said display in response to a control signal generated by the microcomputer, wherein the first input terminal of said switching means is connected to an output terminal of the decoder and the second input terminal of said switching means is coupled to an output of said storing means, wherein said address signal generating means includes a first counter for designating a plurality of locations in said storing means, each of the locations able to store teletext data, said storing means storing teletext data in response to a control signal generated by said microcomputer, and a second counter for addressing a plurality of positions within the location designated by the first counter, each of the positions able to store teletext data involved in one horizontal scanning line, said second counter connected to receive the horizontal synchronizing signal from said separator.

7. A device having a decoder for displaying teletext signals multiplexed into a television video signal, comprising:

an input device for outputting one of a plurality of different operating signals;

a microcomputer for outputting control signals in response to an operating signal from said input device;

a separator for separating a horizontal synchronizing signal from the video signal;

means for generating an address signal according to the separated horizontal synchronizing signal and a control signal outputted by said microcomputer; and storing means, connected to a first output terminal of the decoder, for storing a teletext signal into a location designated by said address signal in accordance with a write control signal from said microcomputer, and for reading the stored teletext signal in accordance with a read control signal from said microcomputer;

a display; and a switching means having first and second terminals, said switching means selectively connecting one of the first and second terminals to an input of said display in response to a control signal generated by the microcomputer, wherein the first input terminal of said switching means is connected to an output terminal of the decoder and the second input terminal of said switching means is coupled to an output of said storing means; and switching means, connected between said decoder and said storing means, said switching means being in a closed state when said storing means performs a writing operation, and being in an opened state when said storing means performs a reading operation.

* * * * *